(12) United States Patent
Marinescu et al.

(10) Patent No.: US 7,844,700 B2
(45) Date of Patent: Nov. 30, 2010

(54) LATENCY FREE SCANNING OF MALWARE AT A NETWORK TRANSIT POINT

(75) Inventors: Adrian M Marinescu, Sammamish, WA (US); Marc E Seinfeld, Mid Levels (HK); Michael Kramer, Yonkers, NY (US); Yigal Edery, Pardesia (IL)

(73) Assignee: Microsoft Corporation, Redmond, WA (US)

( * ) Notice: Subject to any disclaimer, the term of this patent is extended or adjusted under 35 U.S.C. 154(b) by 1061 days.

(21) Appl. No.: 11/097,060

(22) Filed: Mar. 31, 2005

(65) Prior Publication Data

US 2006/0224724 A1    Oct. 5, 2006

(51) Int. Cl.
  G06F 15/173    (2006.01)
  G06F 11/30    (2006.01)
(52) U.S. Cl. .................. 709/224; 726/24; 713/188; 713/187
(58) Field of Classification Search .......... 706/24; 713/187, 188
  See application file for complete search history.

(56) References Cited

U.S. PATENT DOCUMENTS

| 6,088,803 A * | 7/2000 | Tso et al. .............. 726/22 |
| 6,119,165 A | 9/2000 | Li et al. |
| 6,772,345 B1 * | 8/2004 | Shetty .................. 726/24 |
| 7,117,533 B1 * | 10/2006 | Libenzi ................. 726/24 |
| 7,310,815 B2 * | 12/2007 | Yanovsky .............. 726/13 |
| 2003/0021280 A1 | 1/2003 | Makinson et al. |
| 2004/0158741 A1 | 8/2004 | Schneider |
| 2004/0266533 A1 | 12/2004 | Gentles et al. |
| 2005/0027788 A1 | 2/2005 | Koopmans et al. |

* cited by examiner

*Primary Examiner*—George C Neurauter, Jr.
*Assistant Examiner*—Anish Sikri
(74) *Attorney, Agent, or Firm*—Workman Nydegger (57) ABSTRACT

In accordance with the present invention, a system, method, and computer-readable medium for identifying malware at a network transit point such as a computer that serves as a gateway to an internal or private network is provided. A network transmission is scanned for malware at a network transit point without introducing additional latency to the transmission of data over the network. In accordance with one aspect of the present invention, a computer-implemented method for identifying malware at a network transit point is provided. More specifically, when a packet in a transmission is received at the network transit point, the packet is immediately forwarded to the target computer. Simultaneously, the packet and other data in the transmission are scanned for malware by an antivirus engine. If malware is identified in the transmission, the target computer is notified that the transmission contains malware.

17 Claims, 4 Drawing Sheets

LATENCY FREE SCANNING OF MALWARE AT A NETWORK TRANSIT POINT

FIELD OF THE INVENTION

The present invention relates to computers and, more particularly, to protecting a computer from malware.

BACKGROUND OF THE INVENTION

As more and more computers and other computing devices are interconnected through various networks, such as the Internet, computer security has become increasingly more important, particularly from invasions or attacks delivered over a network or over an information stream. As those skilled in the art will recognize, these attacks come in many different forms, including, but certainly not limited to, computer viruses, computer worms, system component replacements, denial of service attacks, even misuse/abuse of legitimate computer system features—all of which exploit one or more computer system vulnerabilities for illegitimate purposes. While those skilled in the art will realize that the various computer attacks are technically distinct from one another, for purposes of the present invention and for simplicity in description, all malicious computer programs will be generally referred to hereinafter as computer malware, or more simply, malware.

When a computer is attacked or "infected" by computer malware, the adverse results are varied, including disabling system devices; erasing or corrupting firmware, applications, or data files; transmitting potentially sensitive data to another location on the network; shutting down the computer; or causing the computer to crash. Yet another pernicious aspect of many, though not all, computer malware is that an infected computer is used to infect other systems.

Figure 1:
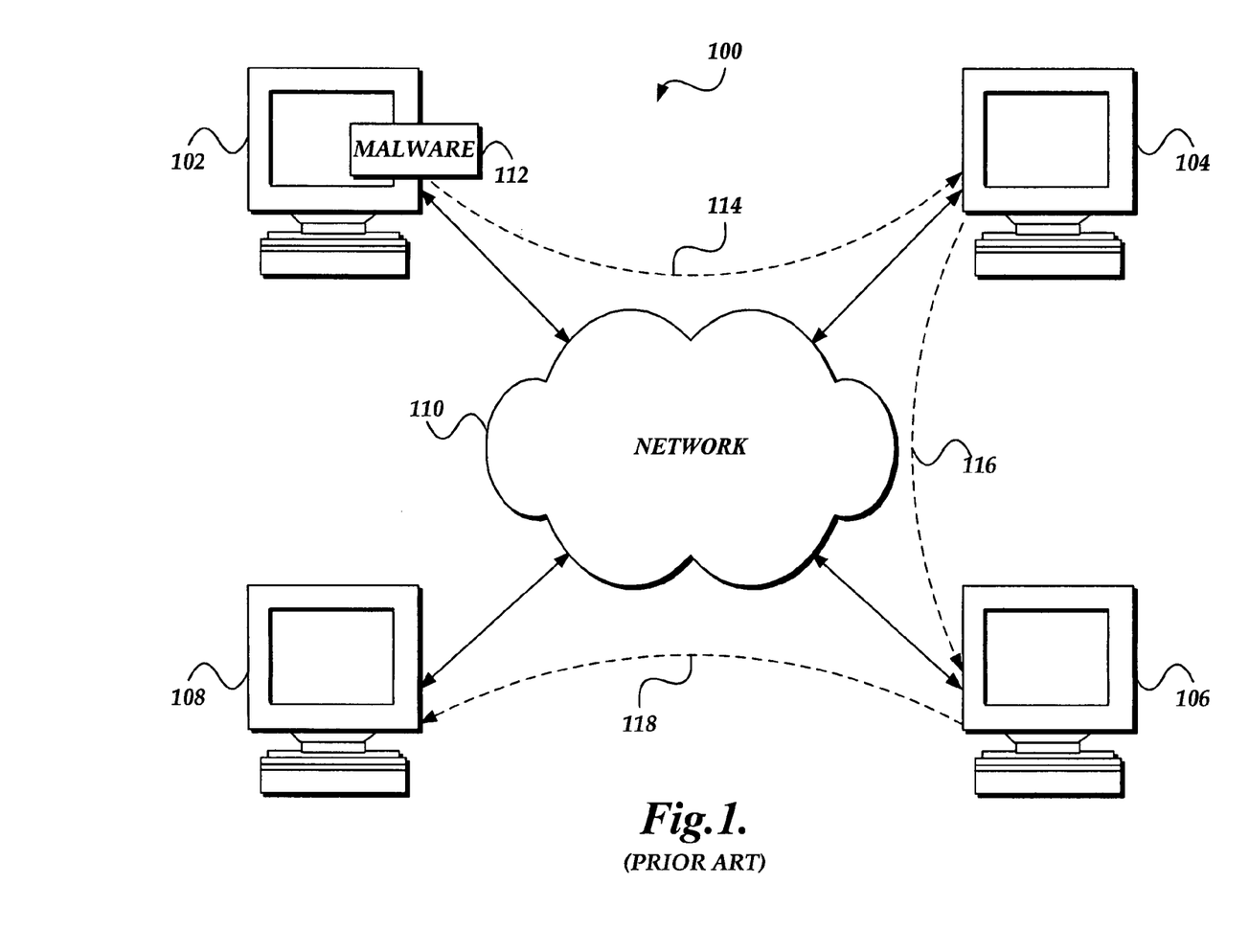
FIG. 1 is a pictorial diagram illustrating an exemplary networked environment, as found in the prior art, over which a computer malware is commonly distributed.

FIG. 1 is a pictorial diagram illustrating an exemplary networked environment 100 over which a computer malware is commonly distributed. As shown in FIG. 1, the typical exemplary networked environment 100 includes a plurality of computers 102-108 all interconnected via a communication network 110, such as an intranet or via a larger communication network including the global TCP/IP network commonly referred to as the Internet. For whatever reason, a malicious party on a computer connected to the network 110, such as computer 102, develops a computer malware 112 and releases it on the network. The released computer malware 112 is received by, and infects, one or more computers, such as computer 104, as indicated by arrow 114. As is typical with many computer malware, once infected, computer 104 is used to infect other computers, such as computer 106, as indicated by arrow 116, which in turn infects yet other computers, such as computer 108, as indicated by arrow 118. It should be appreciated that the malware 112 may be directed to any one of the computers 104-108 as a result of a request initiated by the computer 102. Clearly, due to the speed and reach of the modern computer networks, a computer malware 112 can "grow" at an exponential rate, and quickly become a local epidemic that quickly escalates into a global computer pandemic.

A traditional defense against computer malware and, particularly, computer viruses and worms, is antivirus software. As is known to those skilled in the art and others, antivirus software typically scans data that is transmitted to a computer, searching for identifiable patterns referred to as signatures that are associated with known malware. If a malware signature is identified, the antivirus software takes appropriate action, such as deleting the malware/infected file or removing the malware from an infected file. In this manner, antivirus software may be able to prevent malware from infecting a computer. However, in some instances, users do not maintain antivirus software by regularly obtaining software updates that have the most recent malware signatures. In this instance, a computer may be vulnerable to a malware, even though an "up-to-date" antivirus software would be able to detect the malware.

Another defense that is common today in protecting against computer malware is a network firewall. As those skilled in the art and others will recognize, a firewall is a security system that protects an internal network from unauthorized access originating from external networks by controlling the flow of information between the internal network and the external networks. All communication originating outside of the internal network is sent through a computer that examines the communication and determines whether it is safe or permissible to forward the communication to the intended target.

The malware detection ability of a firewall or similar protection mechanism is limited by the manner in which data is transmitted over modern computer networks. For example, a client-based computer typically requests one or more files when obtaining data from a server-based computer. Those skilled in the art of computer networks will recognize that components of modern networks segment a file into smaller units ("packets") in order to transmit the data file over a limited bandwidth network connection. The packets are transmitted over the network and reassembled when they arrive on the client-based computer. Thus, when file data is received at a network transit point, such as a gateway-type computer that protects an internal network, the data has been segmented into packets.

In the prior art, the packetization of data for transmission over a network limits the ability of a gateway-type computer to scan for malware. In some firewalls, all of the packets in a transmission are received and stored at the network transit point before being forwarded. Then, once all the packets have been received, a scan of the complete file is performed by antivirus software. Stated differently, instead of packets being immediately forwarded to the target computer when received at the network transit point, the packets are stored and scanned before being forwarded. As a result, in this instance, the end-user experiences an increase in latency, or delay, in the time required to receive the file. If individual packets received at the network transit point were scanned for malware and immediately forwarded, thereby reducing or eliminating latency caused by the scan, the network transit point computer would not have a complete context to analyze a file and accurately determine whether the file contains malware.

SUMMARY OF THE INVENTION

In accordance with the present invention, a system, method, and computer-readable medium for identifying malware at a network transit point such as a computer that serves as a gateway to an internal or private network is provided. A network transmission is scanned for malware at a network transit point without introducing additional latency to the transmission of data over the network. As a result, malware may be identified before a complete transmission reaches an internal network without negatively impacting the user-experience, for example, by causing a network connection to "time-out." Aspects of the present invention are interposed between a target computer and an external network so that all communication between the target computer and the external network may be scanned for malware. In accordance with one aspect of the present invention, a computer-implemented method for identifying malware at a network transit point is provided. More specifically, when a packet in a transmission is received at the network transit point, the packet is immediately forwarded to the target computer. Simultaneously, the packet and other data in the transmission are scanned for malware by an antivirus engine. If malware is identified in the transmission, the target computer is notified that the transmission contains malware. More specifically, if the antivirus engine identifies malware, a warning message is transmitted from the network transit point to the target computer, which indicates that the transmission is infected with malware. Alternatively, if the antivirus engine does not identify malware, packets in the transmission are forwarded to the target computer without a warning message.

In accordance with another aspect of the present invention, a system that is configured to identify malware in a transmission that is directed to a target computer is provided. The system includes an antivirus engine designed to identify data characteristic of malware. In one embodiment of the system, the antivirus engine initiates a scan for malware when a packet in a transmission is received at the network transit point. When the last packet is received, the antivirus engine is able to scan all of the packets in the transmission in the context of the other packets. Also, the system includes a firewall module operative to intercept packets transmitted over a network connection and cause the packets to be stored in a cache or other data store. If the antivirus engine identifies malware in a transmission, the firewall module may be configured to forward a warning message to the target computer, which indicates that the transmission is infected with malware.

In still another embodiment, a computer-readable medium is provided with contents, i.e., a program that causes a computing device to operate in accordance with the method described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In accordance with the present invention, a system, method, and computer-readable medium for identifying malware at a network transit point, such as a computer that serves as a gateway to an internal or private network, is provided. One aspect of the present invention is a method that intercepts a packet that is being transmitted from an external network to a target computer inside the internal network. The method causes the packet to be stored in a cache or other data store maintained at the network transit point computer. An antivirus engine may retrieve data in the cache and scan one or more packets received at the network transit point for malware. If the antivirus engine identifies malware, a warning message is transmitted from the network transit point to the target computer, which indicates that the transmission is infected with malware. Alternatively, if the antivirus engine does not identify malware in a transmission, intercepted packets are forwarded to the target computer without a warning message.

Although the present invention will primarily be described in the context of identifying malware at a network transit point such as a gateway, those skilled in the relevant art and others will appreciate that the present invention is also applicable to computer systems other than those described. The following description first provides an overview of a system in which the present invention may be implemented. Then a method that implements the present invention is described. The illustrative examples provided herein are not intended to be exhaustive or to limit the invention to the precise forms disclosed. Similarly, any steps described herein may be interchangeable with other steps or combinations of steps in order to achieve the same result.

Figure 2:
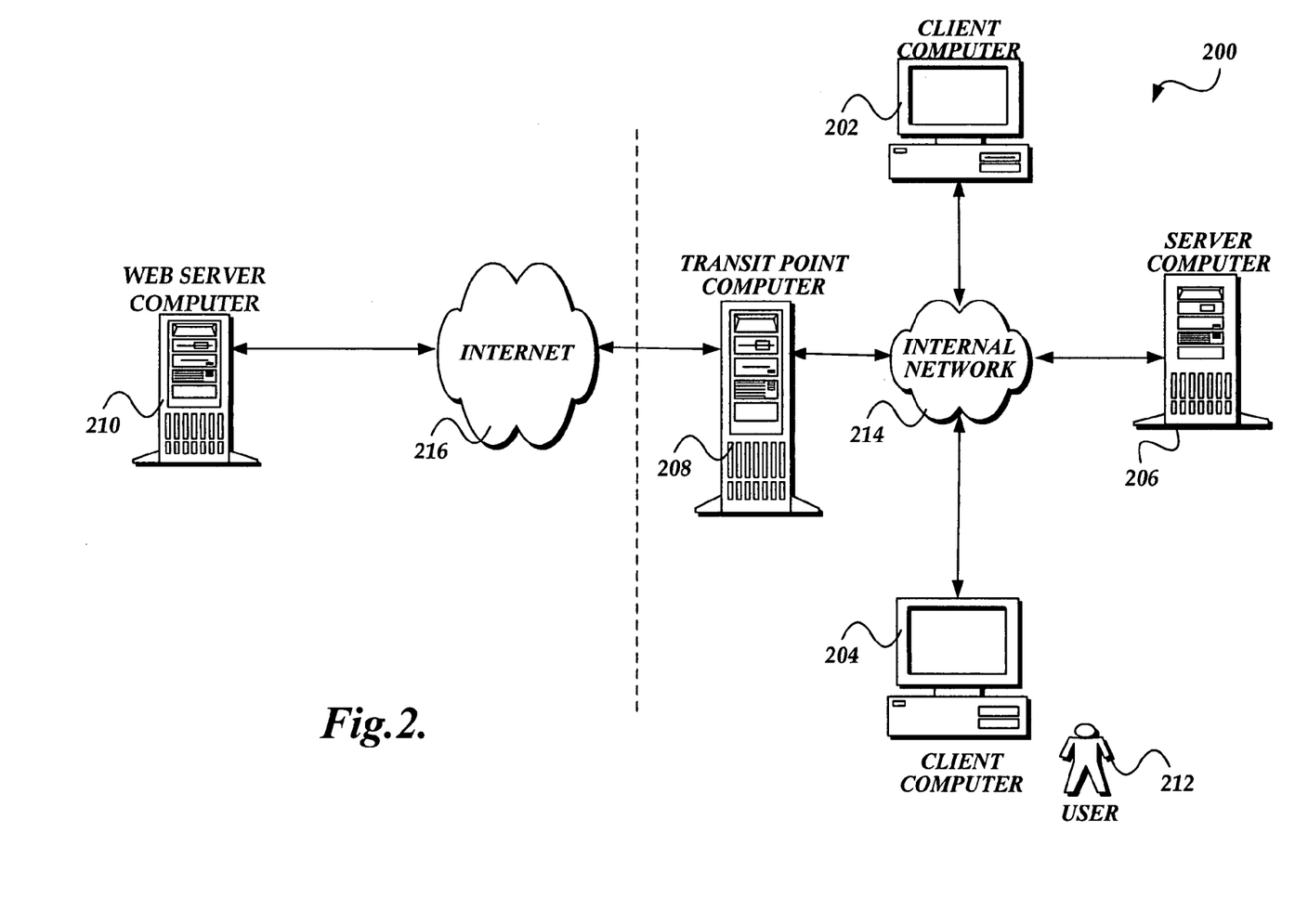
FIG. 2 is a pictorial diagram illustrating an exemplary networked environment that may be used to illustrate aspects of the present invention.

Referring to FIG. 2, the following is intended to provide an exemplary overview of one suitable networked environment 200 that will be used to describe aspects of the present invention. The illustrated environment 200 comprises a plurality of client computers 202 and 204, a server computer 206, a transit point computer 208, and a Web server computer 210. As illustrated in FIG. 2, the client computer 204 is shown associated with user 212. It should be noted that while the present invention is generally described in terms of operating in conjunction with personal computers, such as computer 202, it is for illustration purposes only and should not be construed as limiting upon the present invention. Those skilled in the art will readily recognize that almost any networked computing device may be attacked by a computer malware. Accordingly, the present invention may be advantageously implemented to protect numerous types of computers, computing devices, or computing systems including, but not limited to, personal computers, tablet computers, notebook computers, personal digital assistants (PDAs), mini- and mainframe computers, wireless phones (frequently referred to as cell phones), hybrid computing devices (such as wireless phone/PDA combinations), and the like.

As illustrated in FIG. 2, the client computers 202 and 204, server computer 206, and transit point computer 208 are communicatively connected via the internal network 214. Those skilled in the art and others will recognize that the internal network 214 may be implemented as a local area network ("LAN"), wide area network ("WAN"), cellular network, IEEE 802.11 and Bluetooth wireless networks, and the like. Conversely, the Web server 210 is configured to communicate with the computers connected to the internal network 214 over the Internet 216. As known to those skilled in the art and others, the computers illustrated in FIG. 2 may be configured to exchange documents and other types of files over the networks 214 and 216.

Organizations commonly implement a security system on one or more gateway-type computers, such as the network transit point computer 208. In some organizations, the security system is comprised of a combination of hardware and software that are placed between an internal network 214 and the Internet 216. These systems are designed to protect the resources of the internal network 214 from users of the Internet 216. Stated differently, existing security systems may be configured to filter network packets originating outside of the internal network 214 to determine whether the packets should be forwarded to a target computer connected to the internal network 214. However, some of these existing security systems search for malware in individual packets without considering all of the packets in a transmission as a whole. In this instance, malware may not be detectable without considering all of the packets in a transmission in the context of the other packets. For example, a transmission may contain a program that is self-modifying, such as malware that hides program code using encryption. Those skilled in the art and others will recognize that encryption is a technique used by malware authors to obscure malware program code behind unrecognizable patterns. However, malware that uses encryption also relies on a decryption routine that decrypts a malware "payload" when the malware is scheduled for execution. With regard to the example provided above, encrypted malware may not be detectable without analyzing the packets that contain a decryption routine. In other existing security systems, all of the packets in a transmission are received and stored at the network transit point before being forwarded to the target computer. In these security systems, once all of the packets in a network transmission have been received, a scan of the complete transmission is performed. As a result, the end-user experiences latency or delay as a result of the scan for malware performed at the network transit point.

In general terms, describing one embodiment of the present invention, incoming network packets are stored on the transit point computer 208. When a packet is received, a scan for malware in the incoming packets is initiated. If a packet is not the last packet in the transmission, the packet is immediately forwarded to the target computer. Conversely, a complete transmission may be scanned for malware before the last packet is forwarded to the target computer. By immediately forwarding the incoming packets to a target computer, the present invention has little or no impact on the speed at which data is transmitted on a network. However, aspects of the present invention are able to scan incoming packets in the context of other packets before a complete transmission is available to a target computer.

Effective identification of malware at a gateway-type computer such as the network transit point computer 208 is important as many users delay updating their computers. For example, a delay in updating an operating system or antivirus software may occur because a computer has been inactive. Thus, while the most recent revision of operating system and/or antivirus software may provide adequate protection from a newly discovered malware, a computer may not be "up to date," and thus is susceptible to the malware. However, identifying malware at a gateway-type computer, such as the network transit point computer 208 has inherent challenges that may not exist in a computer associated with an end user. For example, protocols used for communicating between remote computers require that data be transmitted within a predetermined period of time. Stated differently, a connection used to transmit packets of data may "time out" if transmission does not occur within the required time period. As a result, storing packets at the transit point computer 208, without forwarding the packets until a scan of a complete transmission can be performed, may result in a delay that causes a network connection to be terminated. As described in more detail below, the present invention implements techniques that allow a complete transmission to be scanned for malware without causing a network connection to be terminated. Moreover, the present invention implements techniques for allowing complete transmission to be scanned for malware in a way that does not impact the user experience when obtaining data using a "real-time" network protocol.

Aspects of the present invention are most useful when the network transmission being analyzed complies with a protocol that provides "real-time" interaction between two computers. For example, the HyperText Transfer Protocol ("HTTP") is commonly used to transmit a Web page, in the form of a hypertext document, from a Web server to a client-based computer. Typically, the network transmission is initiated in response to a request made by a user of the client-based computer. Modern users have an expectation that requests, such as a request for a Web page, will be satisfied quickly with little noticeable delay. The present invention is most useful in this type of scenario, to accurately and efficiently scan for malware while not inhibiting the "real time" interaction between computers by adding additional latency to the transmission of data.

Figure 3:
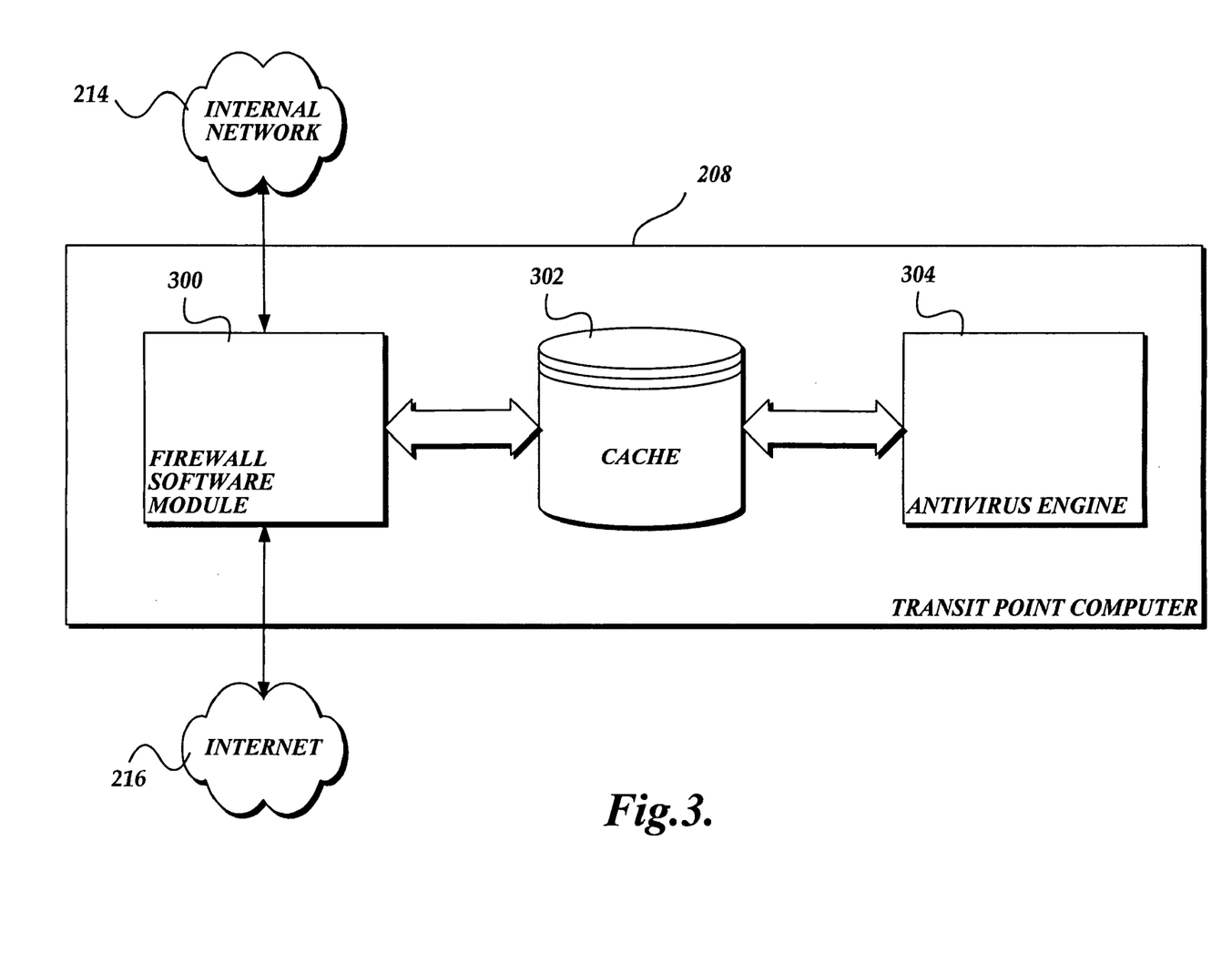
FIG. 3 is a block diagram that depicts a set of components suitable to detect malware on a network transit point computer in accordance with the present invention.

Referring now to FIG. 3, the following is intended to provide an exemplary overview of the components included in the transit point computer 208, illustrated in FIG. 2. As mentioned previously, the transit point computer 208 may be any one of a variety of devices including, but not limited to, personal computing devices, server-based computing devices, and the like. For ease of illustration and because they are not important for an understanding of the present invention, FIG. 3 does not show the typical components of many computers, such as a CPU, keyboard, mouse, printer, or other I/O devices, display, etc. However, as illustrated in FIG. 3, the transit point computer 208 includes a firewall module 300, a cache 302, and an antivirus engine 304. In general terms describing one embodiment of the present invention, components of the transit point computer 208 collectively provide a way to scan a complete transmission for malware before a target computer receives all of the packets in the transmission.

As illustrated in FIG. 3, the transit point computer 208 includes an antivirus engine 304 designed to detect data that is characteristic of malware. Many different software vendors include an antivirus engine or similar software module in antivirus software. One known technique employed by some existing antivirus engines that is used to identify data characteristic of malware includes obtaining a copy of the malware "in the wild." The program code that implements the malware is processed with a hash function that converts the program code or a characteristic subset of the program code into a signature that uniquely identifies the malware. The antivirus engine 304 illustrated in FIG. 3 may employ the known technique of scanning data in a transmission for a malware signature. Also, increasingly, heuristic techniques are employed when identifying data characteristic of malware that may be used by the antivirus engine 304. However, it should be well understood that the examples described herein should be construed as exemplary and not limiting, as the antivirus engine 304 may employ any one of a number of malware detection techniques.

The transit point computer 208 illustrated in FIG. 2 also includes a cache 302. Generally described, a cache refers to a section of volatile computer memory that stores data temporarily so that the data may be accessed quickly. For example, a network cache typically contains copies of frequently requested files so that users may access the files quickly without the file being transmitted from a remote server computer. With regard to the present invention, the cache 302 illustrated in FIG. 3 stores data that is part of a network transmission. As described in more detail below with reference to FIG. 4, all incoming data is copied to the cache 302 where the data is available to the antivirus engine 304. However, those skilled in the art and others will recognize that the cache 302 is not essential for practicing the present invention.

Instead, the transit point computer 208 may store incoming data using any number of existing systems which store data.

As illustrated in FIG. 3, the transit point computer 208 also includes a firewall module 300. Those skilled in the art and others will recognize that a "firewall" is a general term used to describe one type of security system that protects an internal or private network from malware authors who are outside of the network. Generally described, existing firewalls analyze data that is being transmitted to computers inside the internal network in order to filter the incoming data. More specifically, some firewalls filter incoming data so that only packets that maintain certain attributes are able to be transmitted to computers inside the internal network. The present invention further filters incoming data that is directed to a target computer inside an internal network. For example, incoming packets may be stored in the cache 302 where they are accessed by the antivirus engine 304. Typically, a network packet received by the firewall module 300 will immediately be forwarded to the target computer that is the intended recipient of the packet. Concurrently, the firewall module 300 causes the antivirus engine 304 to scan one or more packets in the cache 302 for malware. If malware is identified, the firewall module 300 transmits a warning message to the target computer, which indicates that the transmission is infected with malware.

The functions and features of the transit point computer 208 shown may be implemented in different contexts than those described above. Thus, one or more components of the transit point computer 208 may execute on a remote computer system. Also, while aspects of the present invention are generally described and illustrated as being implemented in software, aspects of the present invention and components of the transit point computer 208 may be implemented in different types of systems than those described. For example, those skilled in the art and others will recognize that one or more components of the transit point computer 208 may be implemented in hardware (e.g., firmware) without departing from the scope of the present invention. Similarly, aspects of the present invention and components of the transit point computer 208 may be implemented in a combination of software on hardware.

As illustrated in FIG. 3, each component of the transit point computer 208, e.g., the firewall module 300, the cache 302, and the antivirus engine 304 are interconnected and able to communicate with the other components. As known to those skilled in the art and others, FIG. 3 is a simplified example of one computer 208 capable of performing the functions of the present invention. Actual embodiments of the computer 208 will have additional components not illustrated in FIG. 3 or described in the accompanying text. Also, FIG. 3 shows one component architecture for scanning a transmission for malware at a network transit point, but other component architectures are possible. Thus, FIG. 3 should be construed as exemplary and not limiting.

Figure 4:
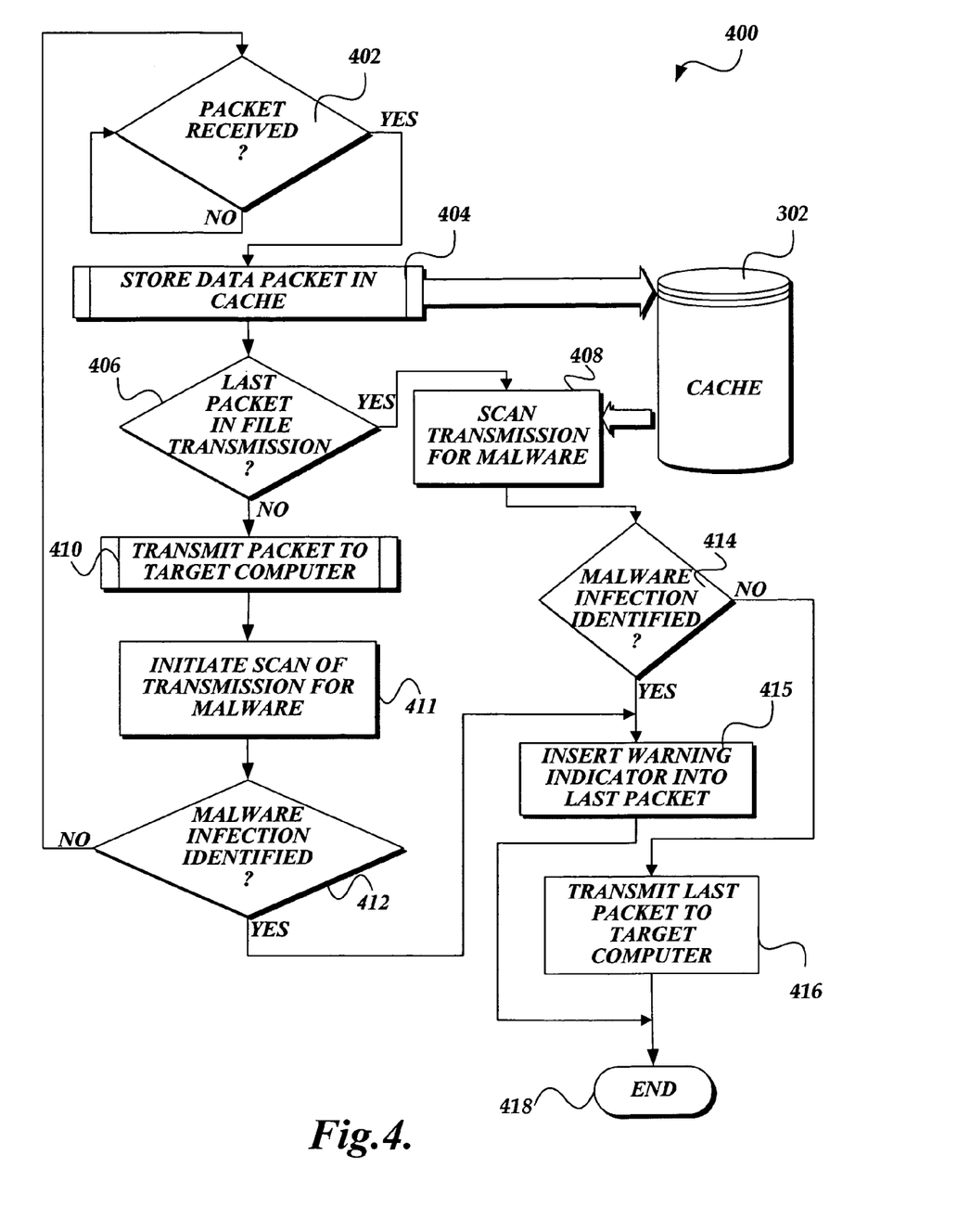
FIG. 4 is a flow diagram illustrating one exemplary embodiment of a scan method that identifies malware at a network transit point in accordance with the present invention.

FIG. 4 is a flow diagram illustrating one exemplary embodiment of a scan method 400, formed in accordance with the present invention. In summary, the scan method 400 causes a transmission to be scanned for malware at a network transit point without introducing additional latency to the transmission of data over the network. As a result, data may be scanned for malware before reaching an internal network without negatively impacting the user experience—for example, by causing a network connection to "time-out." With continuing reference to FIGS. 1-3 and the accompanying descriptions, an exemplary scan method 400 illustrated in FIG. 4 will now be described.

As illustrated in FIG. 4, the scan method 400 begins at block 402 where the method 400 remains idle until a packet is received from a remote computer, such as the Web server computer 210 (FIG. 2). Those skilled in the art and others will recognize that computer users typically issue commands to obtain files that are accessible from a computer network such as the Internet. However, as mentioned previously, components of modern networks segment files into packets which are the units in which file data is transmitted over a network. When a packet is received at the network transit point that implements the present invention, the scan method 400 proceeds to block 404, described below. While the present invention is primarily described primarily in the context of network transmissions and protocols for transmitting a file in smaller units commonly known as packets, those skilled in the art will recognize that the present invention is not limited to these exemplary embodiments. Instead, the present invention may be used to scan any type of data for malware regardless of the different units that may be used to store and/or organize the data.

A computer user may request a file from a remote computer that is transmitted over a network using several known techniques. For example, a user may issue a command to download a file from a Web server. Those skilled in the art and others will recognize that Web servers typically transmit files across the Internet using HTTP. However, in order to view the contents of a hypertext file that complies with the HTTP protocol, the target computer uses a client-based application program. When a hypertext file is rendered by the client-based application program, the program may cause data associated with the file to be executed or to be stored on the computer for later execution. Those skilled in the art and others will recognize that executing data associated with a file that is infected has the potential to expose a computer to the effects of malware. Thus, the present invention will cause a scan of a complete transmission to be performed on a network transit point before the last packet associated with a file is transmitted to a target computer and rendered by a client-based application program. While the scan method 400 may be described primarily in the context of HTTP, the method 400 may be implemented with other protocols used to transmit data over a network, such as the File Transfer Protocol ("FTP"), peer-to-peer protocols, and the like.

At block 404, the scan method 400 causes the packet received at block 402 to be stored in the cache 302 (FIG. 3). As mentioned previously, a computer that implements the present invention may include a cache 302 for temporary storage of packets in a transmission. At block 404, the packet received at block 402 is copied to the cache 302, where it may be accessed by the antivirus engine 304. Since techniques for storing a packet in a volatile area of memory are generally known to those skilled in the art, further description of the techniques used at block 404 will not be described in further detail here. Those skilled in the art and others will recognize that the actions performed at block 404 may use any one of a number of different existing systems for storing incoming data, and that the use of a cache 302 should be construed as exemplary and not limiting.

At decision block 406, the scan method 400 determines if the packet received at block 402 is the last packet in a transmission. Those skilled in the art and others will recognize that when a file is segmented into packets for transmission over a network, data is added to the packets that comply with requirements of a protocol. Stated differently, a packet transmitted over modern networks conforms to well-established rules that allow the packet to be identified after transmission. For example, the HTTP protocol defines a header for a packet that includes the packet's position in a transmission. In one embodiment of the present invention, the scan method 400, at block 404, checks the HTTP headers of received packets and determines if all of the packets in a transmission have been received. In instances in which all of the packets in a transmission have been received, the scan method 400 proceeds to block 408. Conversely, if all of the packets in a transmission have not been received, the scan method 400 proceeds to block 410 described below.

As illustrated in FIG. 4, at block 408, the method 400 scans one or more packets of data stored in the cache 302 for malware. More specifically, data is passed to the antivirus engine 304, at block 408, which indicates that an additional packet was received at the network transit point. In response, the antivirus engine 304 scans one or more packets stored in the cache 302 for malware.

In one embodiment of the present invention, the antivirus engine 304 is configured to scan the packet received at block 402 for malware and request any additional packets that are needed to determine if a transmission is infected. For example, the antivirus engine 304 will typically compare data in the packet received at block 402 with signatures of known malware. However, since previously obtained packets in a transmission may provide a context for determining if a transmission contains malware, the antivirus engine 304 may also scan other previously received packets in the transmission. For example, in modern computer systems, metadata is typically associated with a file that describes attributes of the file. Identifying malware from an individual packet without the context of the metadata associated with the file may be difficult or impossible. Thus, the antivirus engine 304 may be configured to scan a packet and then identify metadata associated with a file from a previously received packet.

It should be well understood that performing a scan for malware, at block 408, may not occur in all instances. For example, when the first packet in a transmission is received at a network transit point, the antivirus engine 304 may scan the packet and determine that the transmission is incapable of exposing a target computer to the effects of malware. In this instance, when the antivirus engine 304 receives notice that a new packet in the transmission was received, the packet may not be scanned.

At block 410, the packet received at block 402 is transmitted to the target computer. If block 410 is reached, the packet is not the last packet in a transmission. In this instance, the packet may be immediately forwarded to the target computer. However, aspects of the present invention will concurrently scan data stored in the cache 302 for malware. Since scanning packets at the network transit point occurs concurrently with transmission of the packets to a target computer, the transmission is not delayed by aspects of the present invention. Also, since packets are being forwarded to the target on a regular basis, a network connection will not "time out" as a result of the processing performed by the present invention.

Those skilled in the art and others will recognize that when a gateway-type computer forwards data to a target computer without knowing the total amount of data in the transmission, certain encoding schemes may be used. For example, as described in more detail below, aspects of present invention may insert a warning message in a network transmission to a target computer when malware is identified. In this and other instances that may be identified by those skilled in the art, the total data in a network transmission may not be known. As a result, an encoding scheme may be used to transmit packets in the transmission. For example, in the context of HTTP, chunked transfer-encoding, which segments an HTTP in a transmission into packets and transmits the packets with their own size indicators may be used.

In accordance with an alternative embodiment of the present invention, a packet is not transmitted to the target computer at block 410. In this instance, data in a transmission is not forwarded to the target computer until a complete scan of all data in a transmission is complete. Instead, a status indicator is forwarded to the target computer, at block 410, when a packet that is not the last packet in the transmission is received at a network transit point. This embodiment of the present invention has the benefit of being highly secure as packets in a transmission are not received by a target computer until all of the packets are scanned for malware. However, since a scan is not performed until all of the packets are received, this embodiment may cause add some latency or delay to a transmission. In instances when a gateway-type computer at the network transit point maintains a fast network connection with a target computer, the additional latency may be minimal and not impact the user experience.

As mentioned previously, the target computer may include a client program that is configured to render or otherwise execute data in a transmission. In accordance with one embodiment of the present invention, the client program will only render a transmission when all of the packets in the transmission are received at the target computer. For example, in the context of HTTP, the client program will typically be a Web browser program that renders Web pages. However, the Web browser program may be configured to only render data from a transmission after all of the packets in the transmission has been received. As a result, data will not be executed until all of the data in a transmission is scanned for malware by the present invention.

As illustrated in FIG. 4, at block 411, the method 400 initiates a scan on one or more packets of data stored in the cache 302 for malware. As described previously, data is passed to the antivirus engine 304 to initiate a scan which indicates that an additional packet was received at the network transit point. In response, the antivirus engine 304 scans one or more packets stored in the cache 302 for malware. However, since techniques for scanning data for malware implemented by a scan engine were described above with reference to block 408, further description of these techniques will not be provided here.

As illustrated in FIG. 4, at decision block 412, the scan method 400 determines if a malware infection has been identified. As mentioned above, the antivirus engine 304 scans data stored in the cache 302 for malware. When malware is identified, notice of the infection is received from the antivirus engine 304 using software-implemented techniques that are generally known in the art. If a malware infection was not identified, the scan method 400 proceeds back to block 402, and blocks 402 through 412 repeat until the last packet in a transmission has been received. Conversely, if a malware infection is identified, the scan method 400 proceeds to block 415 described below.

As illustrated in FIG. 4, if block 414 is reached, the last packet in a transmission was received and the complete transmission is available to the antivirus engine 304 to scan for malware. Similar to block 412, the antivirus engine 304 scans data stored in the cache 302 for malware at block 414. However, the determination made, at block 414, of whether a malware infection exists, occurs before the last packet in the transmission is forwarded to the target computer. As mentioned previously, in one embodiment of the present invention, transmitting the last packet to the target computer may initiate the execution of data on the target computer. Since executing data may expose a computer to malware, the scan method 400 waits until the antivirus engine 304 is able to complete a scan of the transmission. Stated differently, the last packet is not automatically forwarded to the target computer. Instead, the scan method 400 waits until the antivirus engine 304 is able to complete a scan for malware and give notice that the transmission is or is not infected. If a malware infection was not identified, the scan method 400 proceeds to block 416. In instances when a malware infection is identified, the scan method 400 proceeds to block 415 described below.

As illustrated in FIG. 4, at block 415, the scan method 400 inserts a warning indicator into the last packet. If block 415 is reached, malware has been identified in the transmission and the target computer will be notified of the malware infection. In one embodiment of the present invention that involves the HTTP protocol, the warning indicator is transmitted as a numeric value in the header of the HTTP packet, which indicates that a malware infection has been identified. However, those skilled in the art and others will recognize that a target computer may be notified of the malware infection using other techniques. Thus, the embodiment described herein should be construed as exemplary and not limiting. Then, the scan method 400 proceeds to block 418, where it terminates. In response to receiving the warning indicator, the target computer, or a program on the target computer such as a Web browser may be configured to discard packets in the transmission or take other measures for protecting the computer against malware in the transmission.

At block 416, the last packet in a transmission received by the scan method 400 is forwarded to the target computer. As mentioned previously, the last packet is forwarded to the target computer after the antivirus engine 304 has completed a scan of the transmission. Thus, all of the packets in a transmission are available to the antivirus engine 304 before the last packet is transmitted. Then the scan method 400 proceeds to block 418, where it terminates.

In the alternative embodiment of the present invention described above with reference to block 410, the transmission is forwarded to the target computer at block 416. As mentioned previously, in this alternative embodiment, packets are not forwarded to a target computer when the packets are received at the network transit point. Instead, a complete scan of all data is performed before any data is forwarded to the target computer. As a consequence, the scan method 400 to complete transmission to the target computer if malware was not identified, at block 416, after a scan of the transmission is complete.

It should be well understood that the scan method 400, illustrated in FIG. 4, may be implemented with more or fewer steps than those described. For example, in alternative embodiments of the present invention, a scan for malware may not be occur, at block 411, before the last packet in a transmission is received at a network transit point. Stated differently, block 411 is an optional step that is not essential to practicing the present invention. However, initiating one or more scans for malware, before the last packet in a network transmission is received is an optimization implemented for performance reasons. By scanning the packets as they are received at the network transit point, the present invention may identify malware early in a transmission without being required to scan subsequently received packets.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. At a network transit point computer, the network transit point computer including a processor and system memory, the network transit point computer connected to a target computer over a computer network, method of identifying malware in a transmission directed to the target computer that is received at the network transit point computer, the method comprising:
    (a) receiving a packet in the transmission at the network transit point computer;
    (b) determining if the received packet is a last packet;
    (c) storing the received packet in a volatile area of computer memory that is configured to be accessed faster than other areas of computer memory;
    (d) scanning the stored packet for malware;
    (e) concurrent with the scanning of the packet, the processor immediately forwarding the packet to the target computer when the packet is not the last packet in the transmission such that the packet is forwarded to the target computer even if malware is found in the packet;
    (f) when the packet is the last packet in the transmission, scanning the complete transmission for malware before forwarding the packet to the target computer such that the last packet is forwarded to the target computer even if malware is found in the packet; and
    (g) when scanning the packet indicates that the packet contains malware, the processor inserting data indicating that the packet contains malware into the last packet that is forwarded to the target computer to notify the target computer of the malware.

2. The method as recited in claim 1, further comprising when the packet contains malware causing the target computer to discard packets in the transmission.

3. The method as recited in claim 1, further comprising when the packet contains mal ware causing measures for protecting against mal ware to be implemented on the target computer.

4. The method as recited in claim 1, further comprising, when malware is not identified in the last packet, forwarding the packet to the target computer without data being inserted into the packet.

5. The method as recited in claim 1, wherein inserting data indicating that the packet contains malware into the last packet includes inserting a warning message into a subsequent packet in the transmission that is received by the network transit point computer.

6. The method as recited in claim 1, wherein the packet conforms to the requirements of the HyperText Transport Protocol and wherein notifying the target computer of the malware, includes:
    (a) inserting a warning code in the header of the packet; and
    (b) forwarding the packet to the target computer as a HyperText Transport Protocol chunk that is encoded using a chunked transfer-encoding.

7. The method as recited in claim 6, wherein the packet forwarded to the target computer is received by a program that is configured to understand the warning code inserted into the header of the packet and wait until the last packet in a transmission is received before causing data in the transmission to be executed.

8. The method as recited in claim 1, wherein the packet complies with the requirements of the File Transfer Protocol and wherein the packet originated at a computer that acts as a File Transfer Protocol server.

9. A network transit point computer, the network transit point computer including a processor and a computer storage memory, the network transit point computer configured to identify malware in transmission to a target computer, the network transit point computer comprising:

(a) an antivirus engine stored at the computer storage memory that identifies data characteristic of malware from a plurality of packets in the transmission, wherein the plurality of packets contains one or more packets and a last packet and wherein at least one of the one or more packets and the last packet contain malware;

(b) a data store at the computer storage memory for storing the plurality of packets; wherein the data store includes a cache designed for fast access by the antivirus engine and a firewall module;

(c) the firewall module configured to perform the following for the at least one packet of the one or more packets that contains malware:
  (i) receive the at least one packet;
  (ii) store the at least one packet in the data store;
  (iii) forward the at least one packet to the target computer even though the at least one packet contains malware; and
  (iv) cause the antivirus engine to detect the malware contained in the at least one packet subsequent to forwarding the at least one packet; and (d) the firewall module configured to perform the following for the last packet that contains malware:
  (i) receive the last packet;
  (ii) store the last packet in the data store;
  (iii) cause the antivirus engine to detect the malware contained in the last packet;
  (iv) subsequent to causing the detection of the malware in the last packet, inserting into the last packet information indicating that at least one of the plurality of packets is infected by malware; and
  (v) subsequent to inserting the information, forwarding the last packet that contains malware to the target computer.

10. The system as recited in claim 9, wherein the antivirus engine is configured to complete a scan for malware before the firewall module forwards the last packet in the transmission to the target computer.

11. The system as recited in claim 9, wherein the antivirus engine is configured to initiate a scan for malware after each packet in the transmission is received at the network transit point computer.

12. The system as recited in claim 9, wherein the firewall module is configured to insert a warning message into the header of the packet in the transmission if the antivirus engine identifies malware in the transmission.

13. The system as recited claim 12, further comprising a client-based program on the target computer operative to receive and understand the warning message and prevent data in the transmission from being executed.

14. The system as recited in claim 9, wherein the firewall module is configured to forward status messages instead of packets to the target computer until the complete transmission is scanned for malware.

15. A computer program product for use at a network transit point computer, the network transit point computer connected to a target computer over a computer network, the computer program product for implementing a method for identifying malware in a transmission directed to the target computer that is received at the network transit point computer, the computer program product comprising a computer storage memory having stored thereon computer-executable instructions that, when executed by the processor, cause the network transit point computer to perform the method, including the following:

(a) receive a packet in a transmission;
(b) determine if the packet is the last packet in the transmission;
(c) upon determining the packet is not the last packet in the transmission, scan the packet for malware and concurrently forward the packet to the target computer immediately such that the packet is forwarded even if malware is found in the packet;
(d) when the packet is the last packet in the transmission, scan the complete transmission for malware before forwarding the packet to the target computer such that the last packet is forwarded to the target computer even if malware is found in the packet; and
(e) when the scan indicates that the packet contains malware, notify the target computer of the malware by inserting data indicating that the packet contains malware into the last packet that is forwarded to the target computer.

16. The computer program product as recited in claim 15, further comprising computer-executable instructions that, when executed, cause the network transit point computer to scan the complete transmission for malware before the packet is forwarded to the target computer, if the packet is not the last packet in the transmission.

17. The computer program product as recited in claim 16, wherein computer-executable instructions that, when executed, cause the network transit point computer to scan the complete transmission for malware comprise computer-executable instructions that, when executed, cause the network transit point computer to make a call to an antivirus engine that is configured to request previously received packets that are needed to determine whether the transmission contains malware.

\* \* \* \* \*